US012641567B2

(12) United States Patent (10) Patent No.: US 12,641,567 B2
Arngren et al. (45) Date of Patent: May 26, 2026

(54) LOCATION OFFSET DETERMINATION FOR A UAV

(71) Applicant: Telefonaktiebolaget LM Ericsson (PUBL), Stockholm (SE)

(72) Inventors: Tommy Arngren, Södra Sunderbyn (SE); Peter Ökvist, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 324 days.

(21) Appl. No.: 18/559,370

(22) PCT Filed: May 10, 2021

(86) PCT No.: PCT/EP2021/062379
§ 371 (c)(1),
(2) Date: Nov. 7, 2023

(87) PCT Pub. No.: WO2022/237962
PCT Pub. Date: Nov. 17, 2022

(65) Prior Publication Data
US 2024/0381290 A1 Nov. 14, 2024

(51) Int. Cl.
H04W 64/00 (2009.01)
H04W 24/10 (2009.01)
(Continued)

(52) U.S. Cl.
CPC ........... H04W 64/00 (2013.01); H04W 24/10 (2013.01); H04W 52/365 (2013.01); H04W 84/06 (2013.01)

(58) Field of Classification Search
CPC ... H04W 64/00; H04W 64/003; H04W 24/02; H04W 24/10; H04W 52/365; H04W 84/06; H04B 7/18504
See application file for complete search history.

(56) References Cited

U.S. PATENT DOCUMENTS

| | | | |
|---|---|---|---|
| 8,483,120 B2 * | 7/2013 | Seligsohn | .......... H04B 7/18504 |
| | | | 370/316 |
| 10,374,690 B2 * | 8/2019 | Singhal | .............. H04B 7/18504 |

(Continued)

FOREIGN PATENT DOCUMENTS

EP 3876613 A1 9/2021

OTHER PUBLICATIONS

"Control Loops", Revision as of 11:30, Aug. 5, 2020 by MJ (talk | contribs) (→[General Information); retrieved from: http://wiki.paparazziuav.org/w/index.php?title=Control_Loops&oldid=25085; last edited on Aug. 5, 2020.

(Continued)

*Primary Examiner* — Siu M Lee
(74) *Attorney, Agent, or Firm* — Baker Botts L.L.P.

(57) ABSTRACT

There is provided mechanisms for determining a location offset for an UAV. A method is performed by a system comprises an AAN. The AAN is collocated with the UAV and configured to, within a coverage border, serve UEs. The method comprises determining, from measurement reports of received power values received from at least one served UE, a distance measure of the at least one served UE to the coverage border. The method comprises determining, based on the distance measure, the location offset. The location offset defines a difference between a set-point position of the UAV and a dislocated position of the UAV. The dislocated position defines an outer perimeter of a restriction volume in which the UAV can be moved from the set-point position for the AAN to still serve the at least one served UE.

20 Claims, 6 Drawing Sheets

(51) Int. Cl.
     *H04W 52/36*      (2009.01)
     *H04W 84/06*      (2009.01)

(56)                    References Cited

U.S. PATENT DOCUMENTS

|  |  |  |  |
|---|---|---|---|
| 11,089,606 B1 * | 8/2021 | Shetty | .................. H04W 24/02 |
| 2015/0280811 A1 | 10/2015 | Singhal |  |
| 2019/0394695 A1 | 12/2019 | Mueck et al. |  |

OTHER PUBLICATIONS

PCT International Preliminary Report on Patentability (Chapter II of the Patent Cooperation Treaty) issued for International application No. PCT/EP2021/062379—Aug. 9, 2023.

PCT International Search Report issued for International application No. PCT/EP2021/062379—Mar. 9, 2022.

PCT Written Opinion of the International Searching Authority issued for International application No. PCT/EP2021/062379—Mar. 9, 2022.

Getting To Know the Joystick Piloting for Outboard, May 2013, Mercury Marine.

Mercury Marine, Mercury V8 & V6 Outboards; downloaded from—https://www.mercurymarine.com/en-gb/se/; Nov. 22, 2021.

It's a Bird, a Plane . . . It's a Flying Cell Tower "How Drones Have Transformed Disaster Relief"; Partner Content, Produced by Wired Brand Lab for AT&T; downloaded from—https://www.wired.com/brandlab/2018/11/bird-plane-flying-cell-tower/—Nov. 22, 2021.

Art Pregler "When COWs Fly: AT&T Sending LTE Signals from Drones" Technology Blog—Feb. 21, 2017.

\* cited by examiner (a)

(b)

(c)

LOCATION OFFSET DETERMINATION FOR A UAV

PRIORITY

This nonprovisional application is a U.S. National Stage Filing under 35 U.S.C. § 371 of International Patent Application Serial No. PCT/EP2021/062379 filed May 10, 2021 and entitled "LOCATION OFFSET DETERMINATION FOR A UAV," which is hereby incorporated by reference in its entirety.

TECHNICAL FIELD

Embodiments presented herein relate to a method, a system, a computer program, and a computer program product for determining a location offset for an unmanned aerial vehicle.

BACKGROUND

In general terms, an airborne access node (AAN), also known as aerial base station (ABS), or unmanned aerial vehicle (UAV) mounted base station (BS), can be regarded as a flying antenna system that is configured to operate as a hub between a backhaul network and an access network, or to directly provide network access to user equipment (UEs) via the backhaul network. A so-called fly ad-hoc network (FANET) can be established when more than one AAN is involved in such operation. FANETs could be regarded as an aerial form of wireless ad-hoc networks (WANETs) or mobile ad-hoc networks (MANETs).

AANs allow a mobile network operator, or connectivity provider, or network designers, to create on-demand networks in a bordered area that cater to particular users and use cases. Lightweight, Commercial BSs are suitable to be mounted on UAVs with a moderate payload, allowing a wide range of applications.

The problem of finding an optimum location and/or path planning is more challenging for AANs compared to the conventional terrestrial BSs. On the one hand AANs can freely move in 3D space without any borders. On the other hand, there are also a variety of applied constraints that need to be considered for AANs, e.g., to maintain line of sight (LoS) connectivity, energy limitation, and obstacles collision avoidance, many of which are time dependent and are difficult to predict.

Further, once the optimum location and/or path has been found, it could be challenging for the AAN (or more precisely, the UAV carrying the AAN) to maintain the optimum location and/or path, for example due to weather conditions, etc. Therefore, often AANs use a sky/ground hook. In general terms, a sky/ground hook is a technique that defines a position (e.g., given by a global positioning system) that an AAN should not be moved from. This position can thus define a set-value from which the actual position of the AAN, over time, should not deviate from. However, the use of a sky/ground hook might result in that energy is constantly spent on correcting the position of the AAN so that the actual position corresponds to the set-value. This could result in a waste of energy, thus shorten the airborne operation time of the AAS.

Hence, there is still a need for an improved control of an AAN with respect to maintaining its optimum location and/or path.

SUMMARY

An objective of embodiments herein is to provide techniques that strive to maintain the optimum location and/or path for an AAN without the above issues arising, or at least where the above issues are mitigated or reduced.

In general terms, the objective is met by a method for determining a location offset for an UAV, a system configured to perform such a method, a computer program for such a method, and a computer program product comprising such a computer program.

According to a first aspect there is presented a method for determining a location offset for an UAV. The method is performed by a system comprises an AAN. The AAN is collocated with the UAV and configured to, within a coverage border, serve UEs. The method comprises determining, from measurement reports of received power values received from at least one served UE, a distance measure of the at least one served UE to the coverage border. The method comprises determining, based on the distance measure, the location offset. The location offset defines a difference between a set-point position of the UAV and a dislocated position of the UAV. The dislocated position defines an outer perimeter of a restriction volume in which the UAV can be moved from the set-point position for the AAN to still serve the at least one served UE.

According to a second aspect there is presented a system comprises an AAN, for determining a location offset for an UAV. The AAN is collocated with the UAV and configured to, within a coverage border, serve UEs. The system comprises processing circuitry. The processing circuitry is configured to cause the system to determine, from measurement reports of received power values received from at least one served UE, a distance measure of the at least one served UE to the coverage border. The processing circuitry is configured to cause the system to determine, based on the distance measure, the location offset. The location offset defines a difference between a set-point position of the UAV and a dislocated position of the UAV. The dislocated position defines an outer perimeter of a restriction volume in which the UAV can be moved from the set-point position for the AAN to still serve the at least one served UE.

According to a third aspect there is presented a system comprises an AAN, for determining a location offset for an UAV. The AAN is collocated with the UAV and configured to, within a coverage border, serve UEs. The system comprises a first determine module configured to determine, from measurement reports of received power values received from at least one served UE, a distance measure of the at least one served UE to the coverage border. The system comprises a second determine module configured to determine, based on the distance measure, the location offset. The location offset defines a difference between a set-point position of the UAV and a dislocated position of the UAV. The dislocated position defines an outer perimeter of a restriction volume in which the UAV can be moved from the set-point position for the AAN to still serve the at least one served UE.

According to a fourth aspect there is presented a computer program for determining a location offset for an UAV. The computer program comprises computer code which, when run on processing circuitry of a system comprises an AAN, causes the system to perform actions. The AAN is collocated with the UAV and configured to, within a coverage border, serve UEs. One action comprises determining, from measurement reports of received power values received from at least one served UE, a distance measure of the at least one served UE to the coverage border. One action comprises determining, based on the distance measure, the location offset. The location offset defines a difference between a set-point position of the UAV and a dislocated position of the UAV. The dislocated position defines an outer perimeter of a restriction volume in which the UAV can be moved from the set-point position for the AAN to still serve the at least one served UE.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable the position of the AAN to be maintained within a certain distance from the optimum location and/or path such that the cellular connectivity of its served UEs is not impaired too much (depending e.g., on type of service used by the UEs, etc.).

Advantageously, these aspects enable the control of the movement of the UAV to be reduced whilst the AAN still can keep the connection for as many served UEs as possible.

Advantageously, these aspects enable the maximum drifting distance that may be allowed during operation of the AAN whilst reducing the risk of causing degraded service and/or application quality, or even radio link failures or lost service coverage for the served UEs to be determined.

Advantageously, these aspects allow control of the movement of the UAV to be timely triggered, or initiated; not too early (which might result in that energy is constantly spent on correcting the position of the AAN) and not too late (which might result in radio link failures or lost service coverage for the served UEs).

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
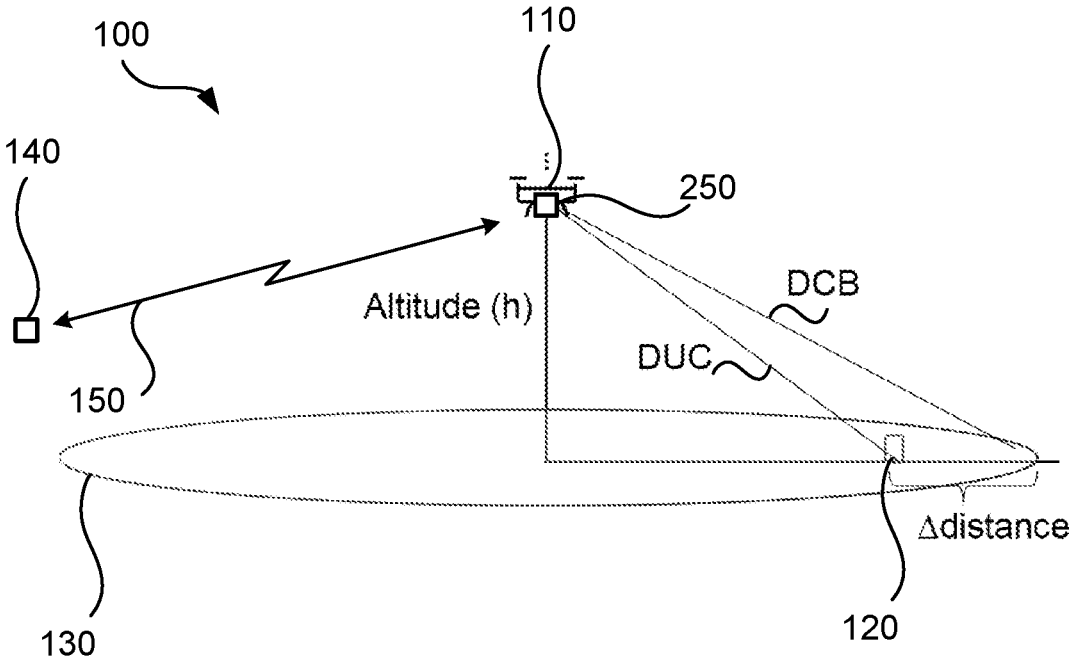
FIG. 1 is a schematic diagram illustrating a communication system according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for an improved control of an AAN with respect to maintaining its optimum location and/or path.

In further detail, assuming that an AAN to some reasonable extent is allowed to drift within its intended coverage area, one question is how far away from its initial position (e.g. defined as a ground-hook position) the AAN can dislocate without impairing the cellular connectivity of its served UEs too much (depending e.g., on type of service used by the UEs 120, etc.). For example, the objective of maintaining the optimum location and/or path of the AAN can then be relaxed and expressed as maintaining the AAN within a certain distance from the optimum location and/or path of the AAN such that the cellular connectivity of its served UEs is not impaired too much. At least some of the herein disclosed embodiments therefore address the problem of how far off the ground-hook position the AAN is allowed to be moved without depleting signal power too much for UEs in critical positions, for example UEs 120 either close to a coverage border or UEs being close to an application-dependent coverage limit.

The embodiments disclosed herein in particular relate to mechanisms for determining a location offset for a UAV. In order to obtain such mechanisms there is provided a system, a method performed by the system, a computer program product comprising code, for example in the form of a computer program, that when run on a system, causes the system to perform the method.

Below, parameters with description as in Table 1 will be used.

TABLE 1

| | |
|---|---|
| List of parameters | |
| Parameter | Description |
| RSRP_cell_border | RSRP value for UE at cell border |
| RSRP_user_cluster | RSRP value for UE in a cluster |
| margin | Margin for the parameter it refers to |
| Distance_cell_border | DCB; Distance Cell Border |

TABLE 1-continued

| Parameter | Description |
|---|---|
| | List of parameters |
| Distance__user__cluser | DUC; Distance User Cluster |
| Linkbudget__coefficient | Link budget coefficient (may include parameters relevant for link budget calculations, for example (but not limited to), transmitter antenna gain, receiver antenna gain, transmit or receiver feeder and associated losses (feeder, connectors, etc.), miscellaneous signal propagation losses (such as fading margin, polarization mismatch, losses associated with medium through which signal is travelling, other losses, etc.) |
| AAN__TxPwr | Transmit power of AAN |
| Δdistance | Difference between Distance__AppCoverage__border and Distance__user__cluser |
| RSRP__AppCoveragecell__border | RSRP at cell border for coverage of an application |
| AAN__ground__hook__dislocation__offset | A distance (either in radio or length measure) from a targeted AAN staying/hoovering position to a later other position for the AAN |
| correction__factor | A distance correction in relation to one or more considered communication or environment parameters associated with AAN operation, typically related to aspects such as weather conditions, ground topology, building types, AAN operation altitude, served UE applications resource demand, application priority, etc. |

FIG. 1 is a schematic diagram illustrating a communications system 100 where embodiments presented herein can be applied. The communications system 100 comprises an UAV 110 and an AAN 250. The communication system 100 further comprises at least one network node 140 in communication with the AAN 250 over a wireless (or even wired) link 150. In this respect, the network node 140 might be a (radio) access network node or a core network node or any other type of network node. The AAN 250 and the network node 140 might define a system 200 (not explicitly shown in FIG. 1). In other alternatives the system 200 is defined by the AAN 250 alone. In yet other alternatives, the system 200 further comprises the UAV 110. The AAN 250 is collocated with the UAV 110 and configured to, within a coverage border 130, serve at least one UE 120. The UAV 110 (and thus the AAN 250) is located at a height h from the ground whereas the at least one UE 120 is assumed to be located at, or close to, the ground. The AAN 250 has a distance DCB to its coverage border 130 (where DCB is short for Distance Cell Border) and a distance DUC (where DUC is short for Distance User Cluster) to the at least one UE 120. The distance, denoted Δdistance, between the at least one UE 120 and the coverage border 130 can thus be determined as:

$$\Delta\text{distance} = \sqrt{(DCB^2 - h^2)} - \sqrt{(DUC^2 - h^2)}$$

Figure 2:
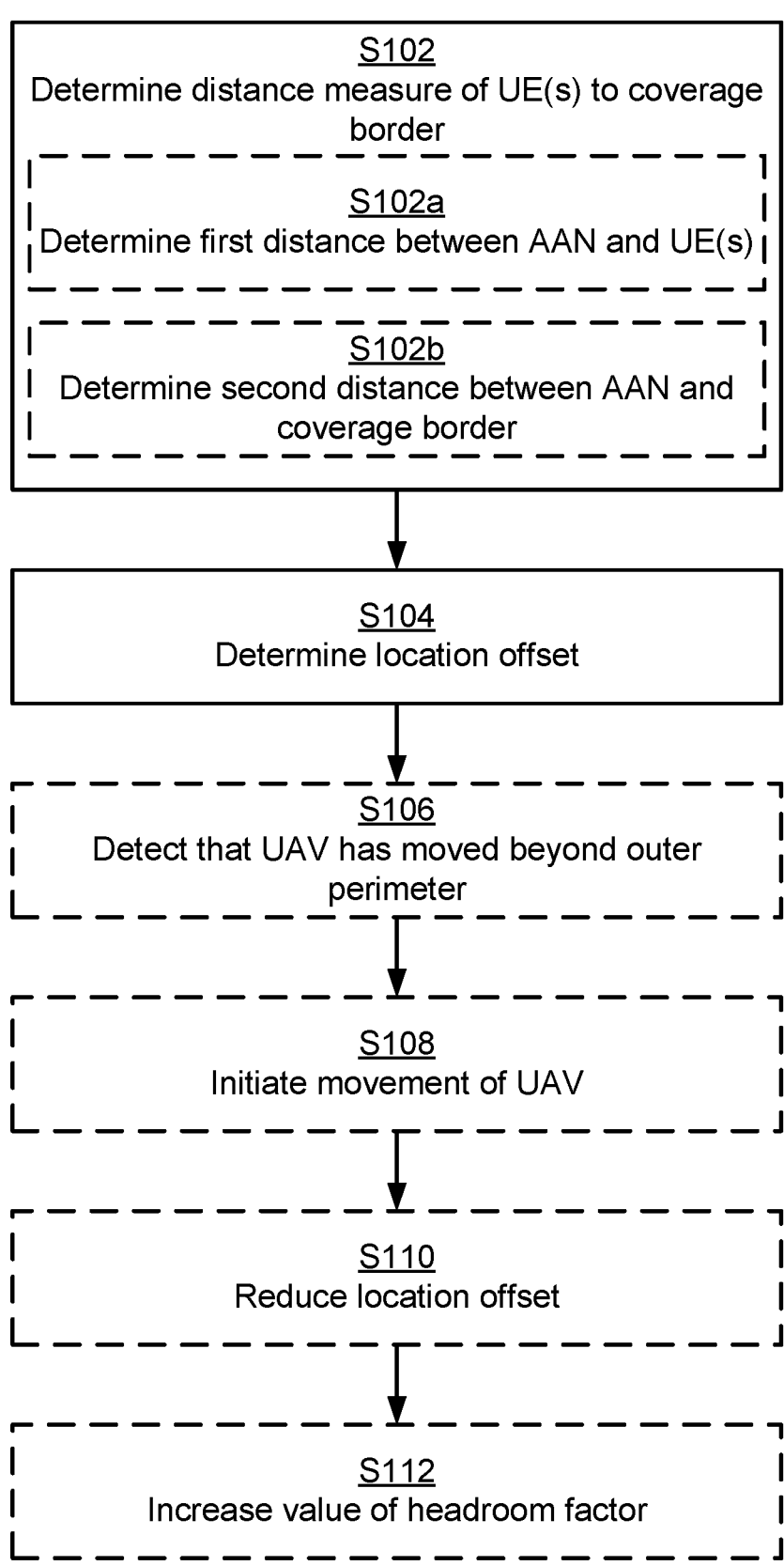
FIG. 2 is a flowchart of methods according to embodiments.

FIG. 2 is a flowchart illustrating embodiments of methods for determining a location offset for a UAV 110. The methods are performed by the system 200. The system 200 comprises an AAN 250. The AAN 250 is collocated with the UAV 110 and configured to, within a coverage border 130, serve UEs 120. The methods are advantageously provided as computer programs 320.

The system 200, based on received measurement reports from its served UEs 120, determines the distance between the served UEs 120 and the coverage border 130, as in action S102:

S102: A distance measure of the at least one served UE 120 to the coverage border 130 is determined from measurement reports of received power values received from at least one served UE 120.

The location offset is then determined as in action S104:

S104: The location offset is determined based on the distance measure. The location offset defines a difference between a set-point position of the UAV 110 and a dislocated position of the UAV 110. The dislocated position defines an outer perimeter of a restriction volume in which the UAV 110 can be moved from the set-point position for the AAN 250 to still serve the at least one served UE 120. In other words, when both vertical and horizontal movement of the UAV 110 is considered, the outer perimeter defines the outer surface (or area) of the restriction volume. This outer surface may be considered to represent an outer boundary area.

Embodiments relating to further details of determining a location offset for a UAV 110 as performed by the system 200 will now be disclosed.

In some aspects, the outer perimeter defines a ground-hook locality constraint. Particularly, in some embodiments, the perimeter defines a ground-hook locality constraint in terms of a maximum offset distance of the UAV 110. Then, during operation of the AAN 250, the UAV 110 is allowed to drift no more than the maximum offset distance from the set-point position to avoid radio link failure or lost service coverage for the at least one served UE 120. Based on the distance measure, the system 200 may thus determine a location offset from its originating ground-hook position to a dislocated position, such that the corresponding received measurement reports from its served UEs 120, when AAN 250 is located in its dislocated position, still are determined being in-coverage, and where the location offset thus corresponds to the maximum offset distance.

There could be different ways to determine, or select, the location offset in case no measurement reports have yet been received by the AAN 250. One way is to use a pre-configured value. Particularly, in some embodiments, upon start of operation of the AAN 250, the location offset is set to a pre-configured value. The pre-configured value might depend on several factors, such as intended mission-operations area of the AAN 250 (i.e., in which area the AAN 250 should provide network service to the UEs 120), intended/planned movement of the UAV 110 over the mission-operations area, etc.

In some aspects, the system 200 gathers statistics of its served UEs 120 over a period of time where the AAN 250 has stood sufficiently still over a position (such as over a ground spot). Particularly, in some embodiments, the measurement reports are received by the AAN 250 whilst the UAV 110 is located within a threshold distance from the set-point position. The threshold distance is smaller than the difference between the set-point position and the dislocated position. By the measurement reports being received by the AAN 250 whilst the UAV 110 is located within the threshold distance from the set-point position ensures that the measurement reports represent statistics as valid for where the AAN 250 is located at, or close to, its intended position (as defined by the set-point position).

In some aspects, the system 200 determines, based on the measurement reports, a distance between itself and the served UEs 120, and determines a distance between itself and the coverage border 130. Particularly, in some embodiments, determining the distance measure in action S102 comprises:

S102*a*: A first distance between the AAN 250 and the at least one served UE 120 is determined from the measurement reports.

S102*b*: A second distance between the AAN 250 and the coverage border 130 is determined from assumed received power values at the coverage border 130.

In some aspects, the system 200 calculates a corresponding physical distance, Δdistance, the served UEs 120 have to the coverage border 130. Particularly, in some embodiments, the distance measure is determined according to a geometrical relation and using the first distance and the second distance.

In some aspects, the system 200 determines one combined distance value for all its served UEs 120. Particularly, in some embodiments, each of the at least one served UE 120 has a respective distance between itself and the AAN 250, and the first distance represents a combined value of all the respective distances. The combined value might be provided in terms of an average value, a medium value, a percentile value, etc.

Figure 3:
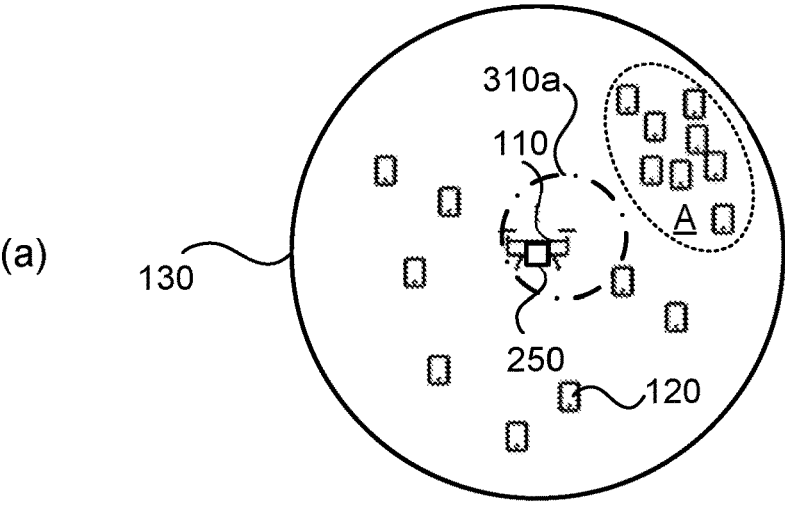
FIG. 3 schematically illustrates AANs with different types of coverage according to embodiments.
Figure 3:
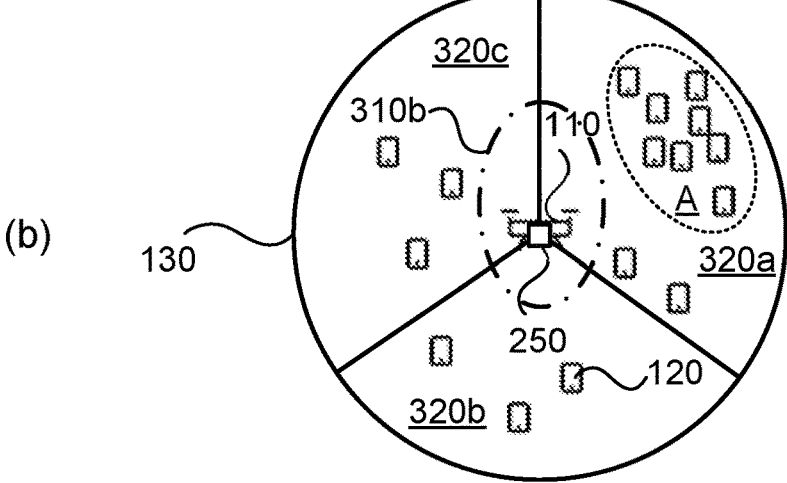
Figure 3:
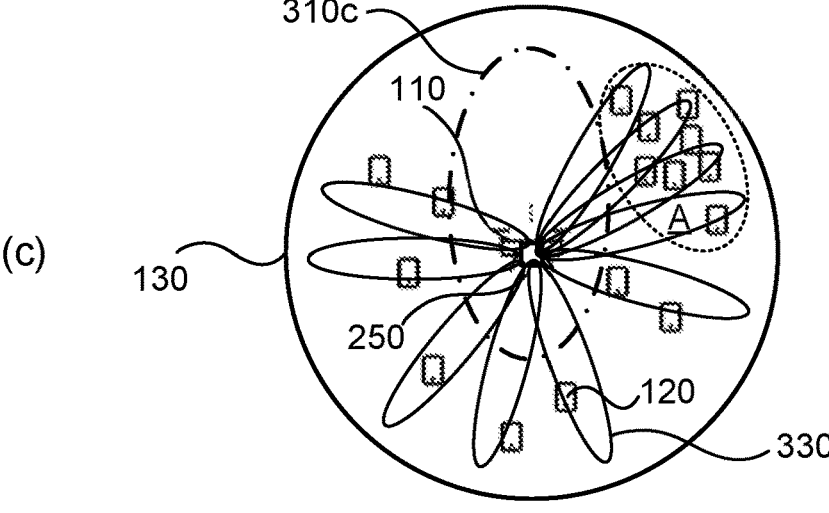

FIG. 3 at (a), (b), (c) schematically illustrates an AAN 250 with omni-direction beam coverage, three-sector beam coverage in sectors 320*a*, 320*b*, 320*c*, and narrow beam coverage (where one beam is identified at reference numeral 330), resulting in different types of coverage regions for the served UEs 120. Dash-dotted lines 310*a*, 310*b*, 310*c* represent the direction-dependent location offset. The system 200 may determine the most critical direction in which the AAN 250 should not be moved with respect to a certain cluster of served UEs 120. In this scenario, the system 200 might calculate a distance (below denoted Δdistance), e.g. 90 meters, for the UEs 120 in the cluster denoted "A" to their cell border, and this 90 meters thus consequently imposes constraints to the mobility of the AAN 250 of the same magnitude. As in FIGS. 3(*b*) and 3(*c*) the system 200 may establish similar relations for the AAN 250 to served UEs as served in a certain sector, or certain beam.

In some aspects, in scenarios where the AAN 250 has beamforming capabilities (either vertical or horizontal, or a combination thereof), the system 200 might estimate the directions towards clusters of served UEs 120. Particularly, in some embodiments, there are clusters of served UEs 120. Then, a respective local distance measure could be determined for each cluster of served UEs 120. Further, a respective local value of the location offset could then be determined for each cluster of served UEs 120. Further, all local values of the location offset could then be combined to define the location offset. The system 200 might thus estimate directions towards clusters, or groups, of served UEs 120.

In some aspects, characteristics of the movement distribution the served UEs 120 over time is considered when determining the location offset. Particularly, in some embodiments, the location offset is determined based on movement over time of the at least one served UE 120. In this way, a large movement over time might yield a small location offset, whilst a small movement over time might yield a large location offset. That is, little movement of the AAN 250 (or UAV 110) is allowed when there is large movement over time of the served UEs 120 and vice versa.

In some aspects, the system 200 determines the most critical direction for the UAV 110 not to move in with respect to one or more served UEs 120. Particularly, in some embodiments, the location offset is direction dependent and is determined to have different values in different directions.

In some aspects, a headroom factor is used to provide means for the system 200 to better tune the location offset. Particularly, in some embodiments, the location offset is determined based on a headroom factor that adjusts the location offset. This enables the system 200 to not only to consider "hard" borders, such as "distance until loss of service, or coverage" but instead considering some headroom, or margin, to relevant measures to provide means for better tuning the location offset to the actual scenario in which the AAN 250 is deployed.

In some aspects, the headroom factor is considered in terms of cell sector (such as physical cell ID (PCI)) or in terms of beam-granularity. Particularly, in some embodiments, the headroom factor is direction dependent. This implies that a margin, in terms of the headroom factor, might be added to the location offset for a served UE 120 (or a cluster of served UEs 120) in some sector/beam, giving this served UE 120 (or cluster of served UEs 120) better protection against potential loss of service, or coverage, than other served UE 120 (or a cluster of other served UEs 120) in some other sector/beam.

In some non-limiting examples, the headroom factor depends on any of: in which type of physical environment and/or at which altitude the AAN 250 is deployed when serving the UEs 120, weather conditions within the coverage border 130 when the AAN 250 is serving the UEs 120, power consumption constraints according to which the AAN 250 is to operate when serving the UEs 120, category, or categories, of the at least one served UE 120, type of network service used by the at least one served UE 120, service prioritization of the at least one served UE 120, link budget for the AAN 250 to utilize for serving the UEs 120, constructional and/or operational parameters or factors of the UAV 110.

The constructional and/or operational parameters or factors of the UAV 110 might pertain to any of: number of propellers, size, weight, payload, battery status, power outtake constraints, etc.

In yet further non-limiting examples, the headroom factor depends on information in terms of any of: weather and wind conditions (that may be received from external information sources (such as weather server) and/or in combination with on-board sensors at the AAN 250), terrain type in surroundings of AAN 250, ground topology in surroundings of AAN 250, operation altitude of AAN 250 (such as near sea level, in a mountain environment), foliage information in surroundings of AAN 250, type of buildings in surroundings of AAN 250, deployment scenario type (rural scenario, urban scenario, etc.), etc.), and context of mission information (such as UEs 120 for a civil service, UEs 120 for a leisure service, UEs 120 for a public safety service, emergency service, etc.). This information might be provided to the system 200 either statically or adaptively during operation. For example, information as specified above and considered valid for a certain part of an operational area might be tagged with positioning information, such as coordinates of a global positioning system, or be obtained using a database lookup, or obtained using on-board radar/lidar ground scanning and/or radio access sensing capabilities. In this respect, radio access sensing can, for example, be used when the radio system itself is being used not only for communication purposes but also for radar-like purposes.

In yet further non-limiting examples, a smaller coverage cell (i.e., a tighter coverage border 130) can be emulated by assigning a lower value to power values in measurement reports received from UEs 120 at the cell border, as RSRP_cell_border +/−margin; then the corresponding cell radio will shrink and the calculated Δdistance virtually indicating the user cluster being closer to cell border. In yet further non-limiting examples other distributions of the power values in the measurement reports can be emulated as RSRP_user_cluster+/−margin; then the corresponding user radio location may be emulated as worse and the effective relation to a coverage border perceived as shorter. In yet further non-limiting examples a distance margin, or variable adjustment factor, is applied directly to the Δdistance measure; this margin may be a static factor or a function of relevant operation-dependent parameters.

Further, given that the mission-operations area of the AAN 250 is known, the headroom factor might be applied prior to takeoff of the UAV 110, or on-demand later on by a flight-monitoring function. Such a flight-monitoring function might, given the intended/planned movement of the UAV 110 over the mission-operations area, select and apply the headroom factor based on any of the above examples.

The distance measure might be defined either in terms of a physical distance in meters or in terms of a radio distance in decibel (dB) or decibel-milliwatts (dBm). Particularly, in some embodiments, the distance measure is either of a physical distance or of a radio domain distance.

Based on received measurement reports from served UEs 120, the system 200 might, when the distance measure is defined in terms of a radio distance, determine a corresponding physical distance between the AAN 250 and the served UEs 120, or a selected percentile of the served UEs 120 (such as a cluster of served UEs 120), and between the AAN 250 and the coverage border 130, where e.g. the cell coverage border reference signal received power (RSRP) level might be known to the system 200 from e.g. link budget or similar, according to the following expressions in pseudo-code, with parameters defined in Table 1:

$$\text{Distance\_cell\_border} == 10 \wedge \big((\text{RSRP\_cell\_border} + \text{Linkbudget\_coefficient} - \text{AAN\_TxPwr}/{-20}\big) \quad (1)$$

$$\text{Distance\_user\_cluser} == 10 \wedge \big((\text{RSRP\_user\_cluster} + \text{Linkbudget\_coefficient} - \text{AAN\_TxPwr}/{-20}\big) \quad (2)$$

In other words, the value of DCB is proportional to RSRP_cell_border added with Linkbudget_coefficient and reduced by AAN_TxPwr. Likewise, the value of DUC is proportional to RSRP_user_cluster added with Linkbudget-_coefficient and reduced by AAN_TxPwr. The power of 10 operation and the division operation with the factor −20 are used to convert from decibel scale to linear scale.

Then system 200 might, with assumptions on other attributes associated with the link budget represented in the Linkbudget_coefficient (such as one or more of: transmitter antenna gain, transmitter losses, other typical losses e.g. fading margin, body loss, polarization mismatch, assumptions on receiver antenna gain and receiver losses, etc.), further calculate the corresponding physical distance (Δdistance) that the served UEs 120, or a selected percentile of the served UEs 120 (such as a cluster of served UEs 120) have to a specific coverage limit, according to the following expression in pseudo-code, with parameters defined in Table 1:

$$\Delta\text{distance} = \text{Distance\_cell\_border} - \text{Distance\_user\_cluster} \quad (3)$$

In the contribution to Linkbuget_coefficient may also be included other typical losses that may vary over the mission-operational area of the AAN 250. For example, such losses may reflect a more challenging coverage situation where a relatively smaller dislocation of the AAN 250 may cause larger variations in signal attenuation; then a part of the operational area determined having larger volatility of the signal variation (i.e. running larger risk of ending up in radio link failure (RLF)) may be associated with a larger headroom factor, whereas an easier operational area (e.g. rural open land) may be associated with a smaller risk of RLF assuming same dislocation of the AAN 250, and hence be associated with a smaller headroom factor.

With reference again to FIG. 3, assuming sufficiently granular sectorization or beamforming capabilities at the AAN 250, the system 200 might determine a specific direction to a specific served UE 120 or specific cluster of served UEs 120 that currently run a prioritized/mission critical application (e.g. emergency call, public safety service, emergency service, application use, etc.) and may apply compensations to any of RSRP_AppCoveragecell-_border, Δdistance, AAN_ground_hook_dislocation_offset or other parameters so that the mobility of the AAN 250 is constrained to minimize the risk of depleting coverage for this specific served UE 120 or specific cluster of served UEs 120.

With respect to category, or categories, of the at least one served UE 120, a UE 120 capable of different uplink/downlink peak data rates (e.g. due to maximum number of supported layers for spatial multiplexing in downlink, etc.), may be equipped with different antenna constellations. Such a UE 120 might have different signal to interference plus noise ratio (SINR) requirements (e.g. depending on modulation and coding scheme (MCS), which in turn depend on the data rate and the number of resource blocks allocated), etc. The SINR requirements may be reflected in the parameter Linkbudget_coefficient or the parameter AAN_TxPwr.

At altitudes significantly smaller than the corresponding cell radius (i.e. h<<DCB in FIG. 1), the length Δdistance as illustrated in FIG. 1 can be reduced to the two-dimensional ground-distance DCB-DUC in equation (3).

Then from Δdistance, the system 200 might further determine a corresponding maximum location offset that the AAN 250 should not exceed to maintain coverage to the served UEs 120, or a selected percentile of the served UEs 120 (such as a cluster of served UEs 120), according to the following expression in pseudo-code, with parameters defined in Table 1:

AAN_ground_hook_dislocation_offset=function
(Δdistance,"parameters").

Figure 4:
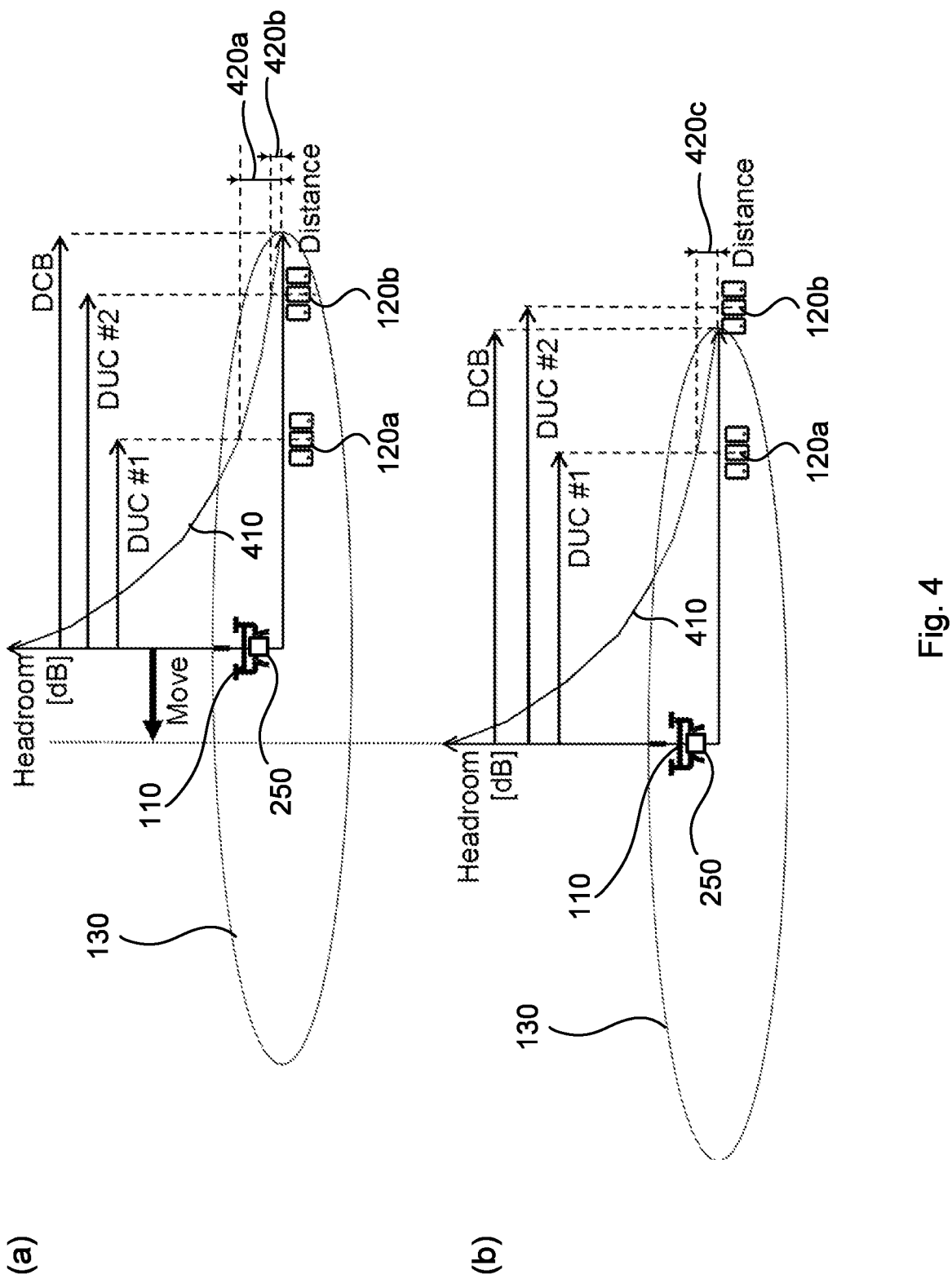
FIG. 4 is a schematic diagram illustrating a communication system according to an embodiment.

Intermediate reference is here made to FIG. 4. FIG. 4 illustrates a communications system 100 comprising an UAV 110 and an AAN 250. The AAN 250 is collocated with the UAV 110 and configured to, within a coverage border 130, serve two clusters of UEs 120a, 120b. The AAN 250 has distance DCB to its coverage border 130 (where DCB is short for Distance Cell Border). The cluster of UEs 120a has a distance DUC #1 to the AAN 250 and the cluster of UEs 120b has a distance DUC #2 to the AAN 250 (where DUC is short for Distance User Cluster). The UAV 110 (and thus the AAN 250) is from FIG. 4(a) to FIG. 4(b) moved in the direction of the arrow labelled "Move" from an initial position to an offset position. Hence, DUC #1 and DUC #2 increase from FIG. 4(a) to FIG. 4(b). At 410 is overlaid a plot of the headroom in dB as a function of distance from the AAN 250. The headroom for the cluster of UEs 120a in FIG. 4(a) is indicated at reference numeral 420a, the headroom for the cluster of UEs 120b in FIG. 4(a) is indicated at reference numeral 420b, and the headroom for the cluster of UEs 120a in FIG. 4(b) is indicated at reference numeral 420c. As can be seen in the figure, the headroom for the cluster of UEs 120a is reduced and the cluster of UEs 120b are on the border of being out of coverage (with zero or very little headroom left) as the UAV 110 (and thus the AAN 250) is moved. Some of the UEs in the cluster of UEs 120b thus risk being out of coverage.

The coverage border 130 might be defined, for example, either in terms of coverage of reference signals or in terms of coverage of data signals. Particularly, in some embodiments, the coverage border 130 is defined by a coverage limit for either uplink or downlink reference signals, or a coverage limit for either uplink or downlink data signals. In this respect, typically the transmission power of the UEs 120 is lower than for the AAN 250, as well as that beamforming capabilities are less elaborated. This furthermore means that the Linkbudget_coefficient that may include transmitter antenna gain, transmitter losses as well as receiver antenna gain and receiver losses may consider respective "reception" and "transmission" differently depending on an uplink scenario or a downlink scenario, respectively, is considered. Further in this respect, instead of considering a "hard" limit for network connectivity for the system 200 to consider as input for the determination of the location offset for the AAN 250, the system 200 might consider what typical signal strength a certain application run in the served UEs 120 require for its proper operation. Then, instead of considering a "cell border" as threshold for the system 200 to consider in its derivation of the Δdistance measure, the system 200 may instead consider the following expressions, as given in pseudo-code, with parameters defined in Table 1:

$$\text{Distance\_AppCoverage\_border} = \ldots =$$
$$10 \wedge \big((\text{RSRP\_AppCoveragecell\_border} + \text{Linkbudget\_coefficient} -$$
$$\text{AAN\_TxPwr}/{-20}\big)$$

$$\text{Distance\_user\_cluser} = \ldots = 10 \wedge \big((\text{RSRP\_user\_cluster} +$$
$$\text{Linkbudget\_coefficient} - \text{AAN\_TxPwr})/{-20}\big)$$

Accordingly, a Δdistance reflecting distance to "AppCoverage border" can be expressed as follows, in pseudo-code, with parameters defined in Table 1:

$$\Delta\text{distance} = \text{Distance\_AppDistance\_border} - \text{Distance\_user\_cluser},$$

Then, AAN_ground_hook_dislocation_offset can be determined as AAN_ground_hook_dislocation_offset=function (Δdistance, "parameters"), where the parameters may relate to the considered user application/service being used in the concerned served UEs 120.

In some examples, the expression AAN_ground_hook_dislocation_offset=function (Δdistance, "parameters") is further elaborated, according to:

$$\text{AAN\_ground\_hook\_dislocation\_offset} = \Delta\text{distance} + \text{correction\_factor},$$

or $$\text{AAN\_ground\_hook\_dislocation\_offset} = \Delta\text{distance} - \text{correction\_factor},$$

where whether to add or deduct correction_factor depends on the definition of correction_factor. The value of correction_factor may be derived offline and provided e.g. in a look-up table representing established distance correction factors in relation to one or more considered "parameters". Establishment of these parameters may be derived via theoretical calculations (such as link budget), numerical simulations on link and/or system level, etc., or as feedback from previous AAN operations where an applied correction-_offset in a given context and environment may be assessed (in terms of allowed drift due thereof and resulting served UE service quality). Such parameters may furthermore comprise aspects such as:

weather/wind conditions (such as: high, low), where correction_factor may comprise: "High A meters", "Low B meters", where e.g. A>B (i.e. more wind, the smaller AAN_ground_hook_dislocation_offset) allowed to secure sufficiently small drift during operation in expected conditions, etc.

ground topology/building types (such as: terrain type flat, open, hilly, rural areas, city center, high buildings) where correction_factor may comprise: "flat ground A meters", "street canyon B meters", where e.g. A<B.

operation altitude (such as: low/ground level, intermediate, high).

applications resource demand (such as: low, high).

application priority (such as: low priority, high priority/ e.g public safety, security, etc.)

In this example, it may be understood that e.g. high application resource demand may call for smaller allowed AAN_ground_hook_dislocation_offset (i.e. larger correction factor) for the AAN 250 as served UEs service may start suffering already at smaller signal strength degradations. Likewise, services with higher priority compared to lower may imply that in the selection of correction_factor, a more restrictive (conservative) value of AAN_ground_hook_dislocation_offset may be selected, reflecting requirements for the high priority. The look-up table might convey a combination of parameters, such as:

"low altitude"+"high buildings"

"high altitude"+"high buildings"

"low altitude"+"low wind"

"high altitude"+"high wind"

"high altitude"+"high wind"+"high applications resource demand", etc.

An AAN 250 serving at least one UE 120 in a scenario with "low altitude"+"high buildings" may be given harder restrictions on AAN_ground_hook_dislocation_offset (i.e., larger correction factor) than a similar scenario with "high altitude"+"high buildings" since the AAN 250 operating at high altitude may suffer less from building shadowing.

In some examples, correction_factor is defined as a fraction of the Δdistance measure. In that way:

$$AAN\_ground\_hook\_dislocation\_offset = \Delta distance + alpha \cdot \Delta distance, \text{ or}$$

$$AAN\_ground\_hook\_dislocation\_offset = \Delta distance - alpha \cdot \Delta distance,$$

where alpha describes a scaling factor (in range o≤alpha<1). For example, assume that wind conditions at altitude A1 is given a "10% of Δdistance margin" to the total dislocation_offset, this would translate to AAN_ground_hook_dislocation_offset=Δdistance−0.1. Δdistance=0.9· Δdistance. At another altitude A2 a more conservative allowed offset is considered; in this case wind conditions at altitude A2 are given a "25% of Δdistance margin" to the total dislocation offset, which would transfer into a total reduced dislocation offset corresponding to AAN_ground_hook_dislocation_offset=Δdistance−0.25·Δdistance=0.75·Δdistance.

Multiple correction_factors representing different parameters can be used, each having an additive nature (in that e.g. "wind and application resource demand" may be considered in two separate factors, whereas e.g. "applications resource demand" and "applications priority" may be expressed in a joint correction factor. Thus, AAN_ground_hook_dislocation_offset can be expressed as:

$$AAN\_ground\_hook\_dislocation\_offset = \Delta distance \cdot (1 - sum(alpha\_i)),$$

where "sum" represents a summation of alpha_i over the index i, where i=1, 2, . . . , n, and where n denotes the total number of correction factors considered. Note that the sum of all corrections factors may be limited and smaller than 1 to represent AAN_ground_hook_dislocation_offset as a valid physical distance interpretation. In a further aspect of multiple corrections factors, one approach considering e.g. two correction factors ("parameters") may be thought of as a two-dimensional interpolations task with respect to respective input values. This approach may also be considered for n input parameters, with corresponding interpolation to be considered with respect to so these n input variables.

In some aspects, the system 200 considers how the distribution of the received power values in the measurement reports vary over time. If the distribution is sufficiently stable over time (considering that the AAN 250 itself is sufficiently stationery in both latitude and longitude as well as in altitude), the system 200 might determine that the served UEs 120 are stationary and require less restriction of Δdistance, or AAN_ground_hook_dislocation_offset than if the distribution is not considered to be sufficiently stable over time. This since the system 200 only needs to consider the movement of itself (or the UAV 110) and not any underlying drift in the distribution of the received power values due to UE mobility. Consequently, if the system 200 determines that distribution of the received power values has a large spread over time, the system 200 may determine that the served UEs 120 are less stationary (i.e. more mobile) and therefore may require larger restriction to Δdistance, or AAN_ground_hook_dislocation_offset, given that the system 200 now should consider also UE-caused underlying drift, shift, alteration, or change in the distribution of the received power values due to UE mobility.

In some aspects, the UAV 110 moves beyond the outer perimeter of the restriction volume. Particularly, in some embodiments, the method further comprises:

S106: It is detected that the UAV 110 has moved beyond the outer perimeter of the restriction volume.

If during operation of the AAN 200, the system 200 detects an increased amount of radio link failures, the root cause may derive from various reasons. Some of these may be typically associated with common communication network challenges such as UEs 120 moving over a cell border, challenging radio propagation conditions, or even malfunction of the UEs 120, etc. But the root cause may also be derived from the flight operation of the UAV 110.

Therefore, the system 200 might detect that certain served UEs 120 suffer from radio link failure, where these served UEs are determined to suffer from radio link failure whilst being served by a certain antenna sector, beam, etc. (i.e. in some certain pointing direction in respect to the orientation of the AAN 250), and where the determined antenna/beam direction area has a directional correspondence to a determined drift from the ground-hook position of the UAV 110. This could imply that the UAV 110 has moved beyond the outer perimeter of the restriction volume.

The system 200 might then perform an action. There could be different actions taken once it has been detected that the UAV 110 has moved beyond the outer perimeter of the restriction volume.

In some examples, the system 200 causes the UAV 110 to be reverted back to the lost ground-hook position, to thus again be inside the outer perimeter of the restriction volume. Hence, in some aspects, when the outer perimeter has been exceeded, movement of the UAV 110 might be controlled so that it is moved towards the lost set-point position. Particularly, in some embodiments, the method further comprises:

S108: Movement of the UAV 110 back towards the set-point position is initiated.

In some aspects, the UAV 110 is reverted back to be within the outer perimeter. Particularly, in some embodiments, the movement is initiated for the UAV 110 to at least be moved back within the outer perimeter of the restriction volume.

In some aspects, once the UAV 110 has exceeded the outer perimeter, more restrictive anti-drift constraints/rules might be applied. Particularly, in some embodiments, the method further comprises:

S110: Reduce the location offset to a smaller value.

S112: Increase a value of a headroom factor, based on which the location offset is determined.

In this respect, the system 200 might be configured to adjust the previously used AAN_ground_hook_dislocation-_offset to consider a smaller offset; i.e. applying more restrictive anti-drift constraints/rules for the UAV 110 to comply with.

Step S102 can then be entered again with the reduced location offset or increased value of the headroom factor.

Figure 5:
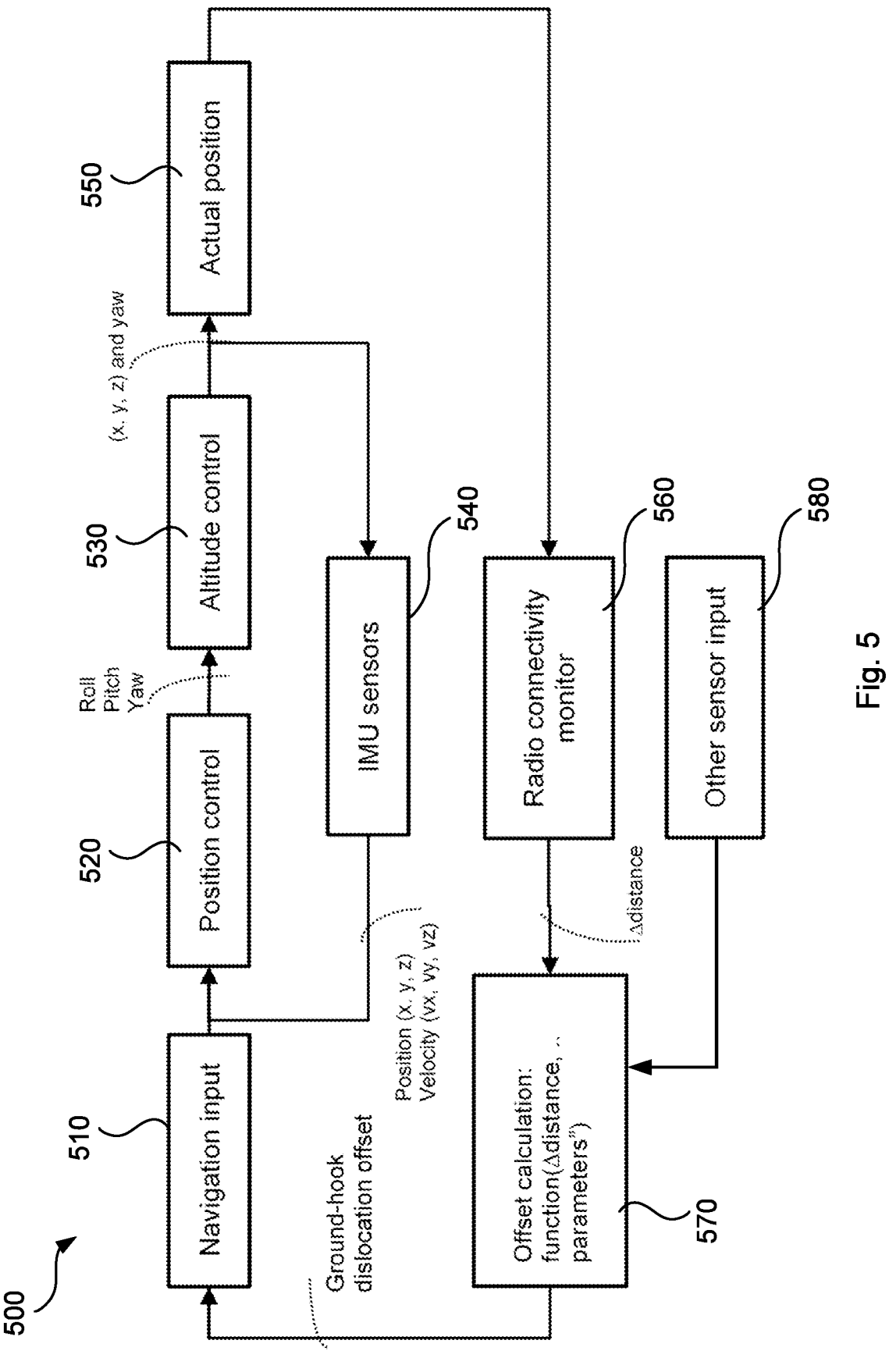
FIG. 5 schematically illustrates a control loop according to an embodiment.

FIG. 5 illustrates a control loop 500 that could be used by the system 200 to perform the methods as thus far have been disclosed. In block 510 navigation input is acquired to determine the position of the UAV 110. In block 520 the position of the UAV 110 is controlled. In block 530 the altitude of the UAV 110 is controlled. In block 540 feedback changes in position and altitude are captured by an Inertial Measurement Unit (IMU). In block 550 movement of the UAV 110 is controlled such that the UAV 110 reaches a preferred position. In block 560 radio conditions (e.g. RSRP distributions of served UEs 120, number of UEs 120 per distribution, beam/antenna/sector/direction information, etc,) are obtained. In block 570 the offset is calculated and fed back to the control loop 500 as navigation input. In block 580 input from other sensors (such as temperature, wind, weather, etc.) is obtained and fed back to the control loop 500 as navigation input.

There could be different types of UAVs 110. In some non-limiting examples, the UAV 110 is either a fixed-wing unmanned aerial vehicle or a rotary-wing, such as a quad-copter or octocopter, UAV. The UAV 110 might even be a satellite.

Hence, despite some of the embodiments have been described in the context of a rotary-wing UAV, the fundamental aspects of the UAV 110 (and the AAN 250) to maintain its position in respect to a selected ground-hook position is still valid. It is understood that the mode of operations and flight operation of fixed-wing and rotary-based UAVs 110 are somewhat different. For example, it is understood that the rotary-wing UAVs 110 may be understood to have more or less equal mobility capabilities in any spatial direction, and not the least is assumed to have capability to hover and by that hang over a selected ground position. For the scenario with a fixed-wing UAV 110, the UAV 110 might not have capabilities to hoover and must maintain a sufficient airspeed to stay in the air. Given that, in the calculations of Δdistance and AAN_ground-_hook_dislocation_offset, a method considering fixed-wing UAVs 110 might involve a measure corresponding to the smallest turning radius (in relation to in-air stability, air-speed, etc.) of the UAV 110 such that implicitly induced around-ground-hook-position undulations also are included in the determination of the location offset to comply with. Moreover, in principle (apart from the flight altitude aspect), the herein disclosed embodiments apply also to maritime vessels, hovercrafts, ground-effect vehicles (GEVs), ships, submerged vessels, etc., i.e. vehicles that in some way operate and navigate with interaction to a viscous medium (air, water, etc.). Similar challenges may also apply e.g. for a ship to maintain its over-ground position while serving as an access network node.

Figure 6:
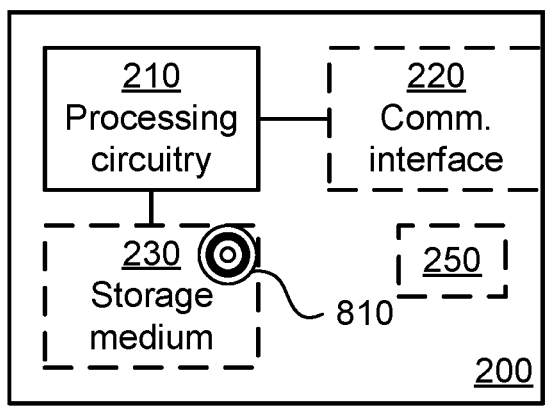
FIG. 6 is a schematic diagram showing functional units of a system according to an embodiment.

FIG. 6 schematically illustrates, in terms of a number of functional units, the components of a system 200 according to an embodiment. As disclosed above, the system 200 comprises the AAN 250. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the system 200 to perform a set of operations, or steps, as disclosed above. For example, the storage medium 230 may store the set of operations, and the processing circuitry 210 may be configured to retrieve the set of operations from the storage medium 230 to cause the system 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The system 200 may further comprise a communications interface 220 at least configured for communications with other entities, functions, nodes, devices, and systems, such as UEs 120, the UAV 110, and a backhaul network. As such the communications interface 220 may comprise one or more transmitters and receivers, comprising analogue and digital components. The processing circuitry 210 controls the general operation of the system 200 e.g. by sending data and control signals to the communications interface 220 and the storage medium 230, by receiving data and reports from the communications interface 220, and by retrieving data and instructions from the storage medium 230. Other components, as well as the related functionality, of the system 200 are omitted in order not to obscure the concepts presented herein.

Figure 7:
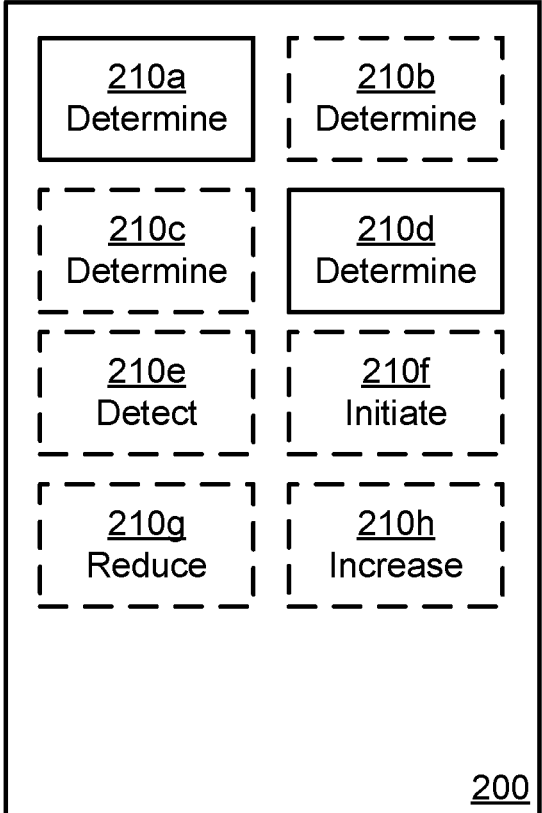
FIG. 7 is a schematic diagram showing functional modules of a system according to an embodiment.

FIG. 7 schematically illustrates, in terms of a number of functional modules, the components of a system 200 according to an embodiment. The system 200 of FIG. 7 comprises a number of functional modules; a first determine module 210a configured to perform step S102, and a second determine module 210d configured to perform step S104.

The system 200 of FIG. 7 may further comprise a number of optional functional modules, such as any of a third determine module 210b configured to perform step S102a, a fourth determine module 210c configured to perform step S102b, a detect module 210e configured to perform step S106, an initiate module 210f configured to perform step S108, a reduce module 210g configured to perform step S110, and an increase module 210h configured to perform step S112.

In general terms, each functional module 210a: 210h may in one embodiment be implemented only in hardware and in another embodiment with the help of software, i.e., the latter embodiment having computer program instructions stored on the storage medium 230 which when run on the processing circuitry makes the system 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a: 210h may be implemented by the processing circuitry 210, possibly in cooperation with the communications interface 220 and/or the storage medium 230. The processing circuitry 210 may thus be configured to from the storage medium 230 fetch instructions as provided by a functional module 210a: 210h and to execute these instructions, thereby performing any steps as disclosed herein.

The system 200 may be provided as a standalone device or as a part of at least one further device. Functionality of the system 200 may thus be distributed between at least two devices, or nodes. The at least two nodes, or devices, may either be part of the same network part (such as a radio access network or a core network) or may be spread between at least two such network parts. For example, part of the system 200 may be provided in a node of a radio access network and part of the system 200 may be provided in a node of a core network. In general terms, instructions that are required to be performed in real time may be performed in a device, or node, operatively closer to the cell than instructions that are not required to be performed in real time. One of these devices, or nodes, is the AAN 250.

In this respect, the AAN 250 might offload certain calculations, such as relating to signal strength distribution calculations, offset margin selections, etc. to a core network node, or edge computing node, server, or the like, to reduce the amount of calculations required to be performed the AAN 250. Such offloading could reduce the energy consumption, or energy requirements, of the AAN 250. Such a core network node, edge computing node, server, or the like may furthermore be configured to support the AAN 250 in determining the location offset based on a machine learning (ML) model trained on multi-user behavior learnt from previous operation of the AAN 250, based on hourly/daily traffic patterns, weather conditions, environment conditions, mission purpose, etc.

Thus, a first portion of the instructions performed by the system 200 may be executed in a first device, and a second portion of the of the instructions performed by the system 200 may be executed in a second device; the herein disclosed embodiments are not limited to any particular number of devices on which the instructions performed by the system 200 may be executed. Hence, the methods according to the herein disclosed embodiments are suitable to be performed by a system 200 residing in a cloud computational environment. Therefore, although a single processing circuitry 210 is illustrated in FIG. 6 the processing circuitry 210 may be distributed among a plurality of devices, or nodes. The same applies to the functional modules 210a: 210h of FIG. 7 and the computer program 820 of FIG. 8.

Figure 8:
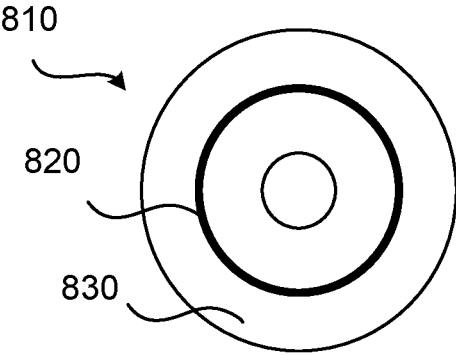
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory, a read-only memory, an erasable programmable read-only memory, or an electrically erasable programmable read-only memory and more particularly as a non-volatile storage medium of a device in an external memory such as a USB memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a location offset for an unmanned aerial vehicle, UAV, the method being performed by a system comprising an airborne access node, AAN, wherein the AAN is collocated with the UAV and configured to, within a coverage border, serve user equipment, UEs, the method comprising:

determining, from measurement reports of received power values received from at least one served UE, a distance measure of the at least one served UE to the coverage border; and determining, based on the distance measure, the location offset, wherein the location offset defines a difference between a set-point position of the UAV and a dislocated position of the UAV, and wherein the dislocated position defines an outer perimeter of a restriction volume in which the UAV can be moved from the set-point position for the AAN to still serve the at least one served UE.

2. The method according to claim 1, wherein the outer perimeter defines a ground-hook locality constraint in terms of a maximum offset distance of the UAV, wherein during operation of the AAN, the UAV is allowed to drift no more than the maximum offset distance from the set-point position to avoid radio link failure or lost service coverage for the at least one served UE.

3. The method according to claim 1, wherein the measurement reports are received by the AAN whilst the UAV is located within a threshold distance from the set-point position, where the threshold distance is smaller than the difference between the set-point position and the dislocated position.

4. The method according to claim 1, wherein determining the distance measure comprises:

determining, from the measurement reports, a first distance between the AAN and the at least one served UE; and determining, from assumed received power values at the coverage border, a second distance between the AAN and the coverage border.

5. The method according to claim 4, wherein the distance measure is determined according to a geometrical relation and using the first distance and the second distance.

6. The method according to claim 4, wherein each of the at least one served UE has a respective distance between itself and the AAN, and wherein the first distance represents a combined value of all the respective distances.

7. The method according to claim 1, wherein there are clusters of served UEs, wherein a respective local distance measure is determined for each cluster of served UEs, wherein a respective local value of the location offset is determined for each cluster of served UEs, and wherein all local values of the location offset are combined to define the location offset.

8. The method according to claim 1, wherein the location offset is determined based on movement over time of the at least one served UE.

9. The method according to claim 1, wherein the location offset is direction dependent and is determined to have different values in different directions.

10. The method according to claim 1, wherein the location offset is determined based on a headroom factor that adjusts the location offset.

11. The method according to claim 10, wherein the headroom factor is direction dependent.

12. The method according to claim 10, wherein the headroom factor depends on any of:

in which type of physical environment and/or at which altitude the AAN is deployed when serving the UEs, weather conditions within the coverage border when the AAN is serving the UEs, power consumption constraints according to which the AAN is to operate when serving the UEs, category, or categories, of the at least one served UE, type of network service used by the at least one served UE, service prioritization of the at least one served UE, link budget for the AAN to utilize for serving the UEs, constructional and/or operational parameters or factors of the UAV.

13. The method according to claim 1, wherein the distance measure is either of a physical distance or of a radio domain distance.

14. The method according to claim 1, wherein the coverage border is defined by a coverage limit for either uplink or downlink reference signals, or a coverage limit for either uplink or downlink data signals.

15. The method according to claim 1, wherein, upon start of operation of the AAN, the location offset is set to a pre-configured value.

16. The method according to claim 1, wherein the method further comprises:

detecting that the UAV has moved beyond the outer perimeter of the restriction volume.

17. The method according to claim 16, wherein the method further comprises:

initiating movement of the UAV back towards the set-point position.

18. The method according to claim 17, wherein the movement is initiated for the UAV to at least be moved back within the outer perimeter of the restriction volume.

19. The method according to claim 16, wherein the method further comprises:

reducing the location offset to a smaller value; and/or increasing a value of a headroom factor based on which the location offset is determined.

20. A system comprising an airborne access node, AAN, for determining a location offset for an unmanned aerial vehicle, UAV, wherein the AAN is collocated with the UAV and configured to, within a coverage border, serve user equipment, UEs, the system comprising processing circuitry (210), the processing circuitry being configured to cause the system to:

determine, from measurement reports of received power values received from at least one served UE, a distance measure of the at least one served UE to the coverage border; and determine, based on the distance measure, the location offset, wherein the location offset defines a difference between a set-point position of the UAV and a dislocated position of the UAV, and wherein the dislocated position defines an outer perimeter of a restriction volume in which the UAV can be moved from the set-point position for the AAN to still serve the at least one served UE.

* * * * *